(No Model.) 2 Sheets—Sheet 1.
C. H. HORTON.
COMBINED GRAIN THRASHER AND CLOVER SEED HULLER.
No. 412,257. Patented Oct. 8, 1889.
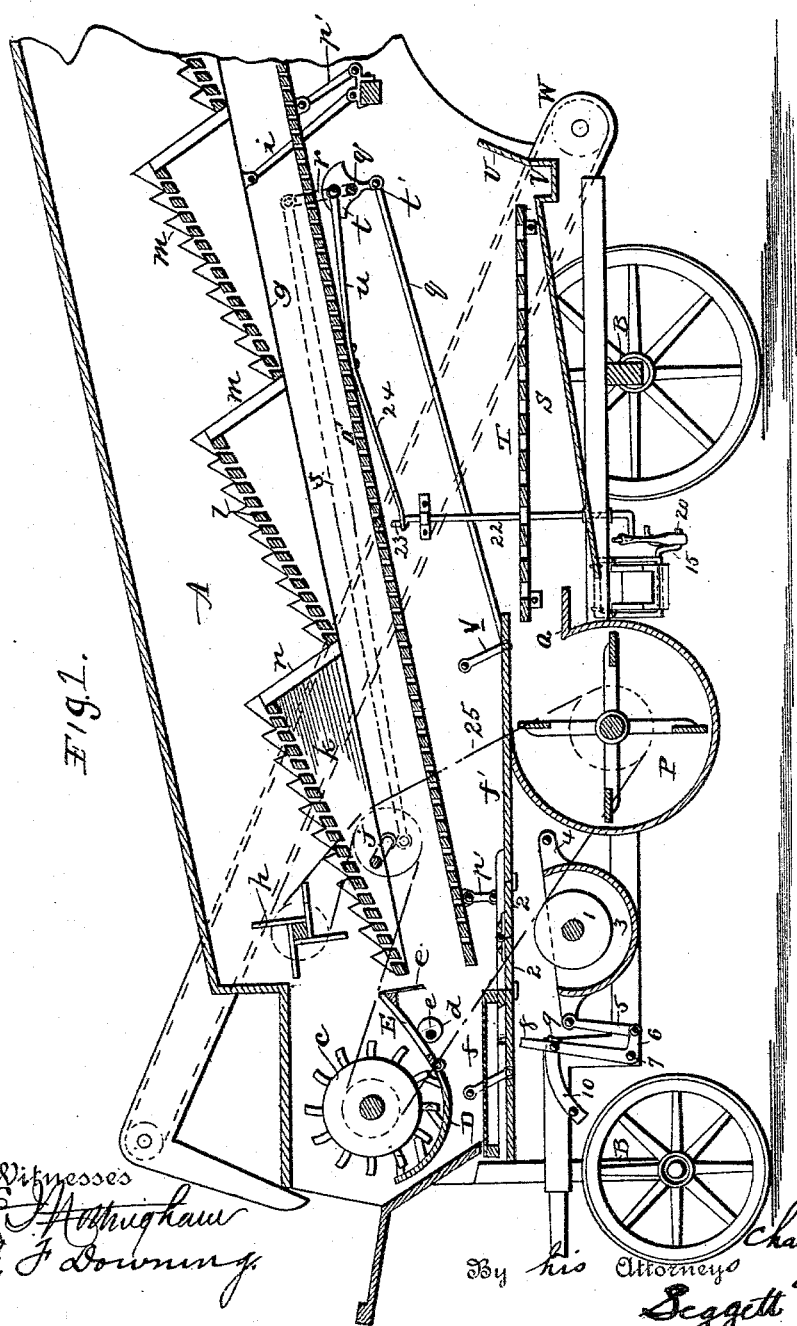

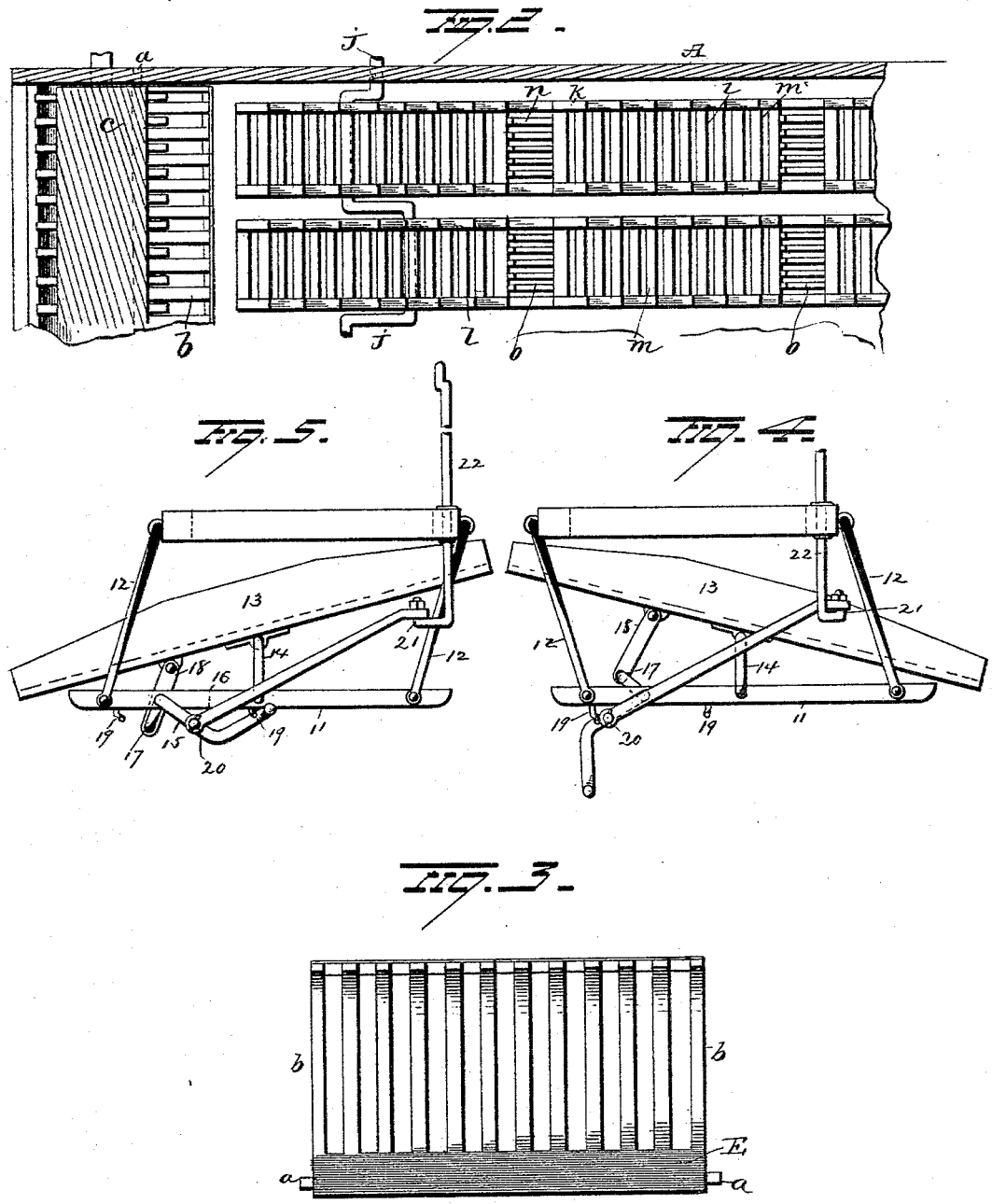

UNITED STATES PATENT OFFICE.

CHARLES H. HORTON, OF WELLINGTON, OHIO.

COMBINED GRAIN-THRASHER AND CLOVER-SEED HULLER.

SPECIFICATION forming part of Letters Patent No. 412,257, dated October 8, 1889.

Application filed January 19, 1889. Serial No. 296,900. (No model.)

*To all whom it may concern:*

Be it known that I, CHARLES H. HORTON, of Wellington, in the county of Lorain and State of Ohio, have invented certain new and useful Improvements in Combined Grain-Thrasher and Clover-Seed Huller; and I do hereby declare the following to be a full, clear, and exact description of the invention, such as will enable others skilled in the art to which it appertains to make and use the same.

My invention relates to an improvement in combined grain-thrashers and clover-seed hullers.

The object is to increase the separating capacity and effect a more complete and thorough separation of the seed and grain from the straw.

A further object is to provide a mechanism for delivering the grain on either side of the machine with equal facility; and with these ends in view my invention consists in certain novel features of construction and combinations of parts, as will be hereinafter fully described, and pointed out in the claims.

In the accompanying drawings, Figure 1 is a longitudinal sectional elevation of my improved machine. Fig. 2 is a horizontal sectional view. Fig. 3 is a detailed view of the cylinder-grate, and Figs. 4 and 5 show the extreme positions taken by the rocking grain-spout.

A represents the body of the machine, carried on trucks B.

C is the regular cylinder, with its concave D beneath. A grate E is supported in the sides of the machine at its front ends by the trunnions $a$, and in such a manner that its bars $b$ extend backward longitudinally of the machine toward the separating-racks. Beneath this grate a spindle $c$ extends transversely of the machine, and on it cams $d$ are placed, so that by turning the spindle these cams impinge against the lower side of the grate and raise or lower it, according to the direction in which the cams are turned. A ratchet and pawl (not shown) lock the spindle as adjusted. On the rear edge of this grate, just below the top of the bars, an apron $e$ depends a sufficient distance to prevent the grain removed from the straw by the action of the cylinder from being driven through the grate and through the machine, but instead deflects the grain, so that it drops upon the shaking-pan $f$ immediately below.

From the cylinder the thrashed straw is discharged over the apron $e$ with sufficient force to drive it onto the separator $g$, and as an expedient to prevent this straw from lodging too far over upon the separator, so as to lose the benefit of traveling upon it, the beaters $h$ are provided, they revolving in the same direction as the cylinder, thereby impeding the passage of the straw and stopping it at the forward edge of the separator.

The separator $g$ is of novel construction, and a brief description will follow. It consists of long narrow frames supported on vibrating arms $i$ at the rear and upon a crank-shaft $j$ at the forward end. These frames are made of the side pieces $k$ in the general shape of steps, and over these are secured the serrated ribs $l$. Said ribs extend transversely across from one side piece to the other, and slots $m$ extend correspondingly between the ribs. In each frame there are several of these inclines, and between them shorter and oppositely-extending inclines $n$ are located. The latter are also slotted, but the slots $o$ in this instance extend at right angles to those in the long inclines. The crank-shaft $j$, revolving rapidly, raises the adjacent separator-frames alternately in rapid succession, so that the straw is caught by the serrated ribs and tossed forward, dropping the grain left therein through the slots. The straw then drops from the upper ends of these inclines down the short inclines where it is unobstructed in its passage and where the straw is relieved of what grain has not dropped through the transverse slots. The grain and chaff falling through this separator $g$ drop onto the shaking-bottom $o'$, which latter is supported at each end on vibrating arms $p'$ and extends about parallel with the separator $g$. The shaking-bottom is vibrated in the following manner: A rocking shaft $q$ extends transversely of the machine near the rear of the latter. One end of the shaft is bent to form a crank $r$, and a pitman $s$ extends from the crank-shaft $j$ to this crank $r$. This same shaft is provided with two oppositely-extending arms $t\ t'$. The former is connected with the shaking-bottom $o'$ by means of the pitman $u$, projecting from the bottom $o'$. The pan $f'$, which receives the grain and chaff from the bottom $o'$, is supported on links $v$, and from one end of the pan a pitman $q$ extends to the arm $t'$. Now, to go back a little, the main crank-shaft $j$, revolving, reciprocates the pitman $s$, and the latter rocks the shaft $q$, which, in turn, imparts motion to shaking-bottom $o'$ through pitman $u$, and to pan $f'$ through pitman $q$. From this pan $f'$ the chaff and grain are delivered to the fan-blower P, by means of which the chaff and other light stuff are blown away from over the sieve or screen S, while the grain falls into the grain-spout. The grains that may be blown over bottom T are caught by the guard U and spout V and discharged thereby into the elevator W, to be returned to the cylinders, if desired, or to the fan, as the condition may require.

For the purpose of the clover-huller attachment the cylinder 1 is located under pan $f'$, in advance of the fan. This pan $f'$ has an opening covered by removable sections 2, directly over the cylinder 1, for the latter to rise up through when adjusted for work, and through which the unhulled seed falls to the cylinder-concave 3. The latter is pivoted by arms 4 to the frame, and is connected by arms 5 at the opposite end to the elbow-lever 6, arranged on rock-shaft 7, so that it is swung up into position by depressing the handle 8 of said elbow-lever 6, and is secured in working position by a binding-screw 9, screwing into the arc 10.

It has been observed that the material, after passing apron Q, is discharged into the grain-spout. This spout is of novel construction, being arranged to discharge grain on either side of the machine, and hence a detailed description will follow. A shelf 11 is suspended horizontally, so as to extend transversely beneath the machine, upon hangers 12, and a trough 13 is pivotally supported at its center upon this shelf by means of arms 14. Thus the trough is arranged to be tilted one way or the other, accordingly as it is desirable to discharge the grain on the right or left side of the machine. Further than this, it is of importance that the spout should have a tossing motion, in order to throw the grain all out of the spout. This is attained in the following manner: A crank-shaft 15 extends part way across the shelf 11 into a slot 16, where its end, after being bent at right angles to the shank of the crank, terminates in a wrist 17. Said wrist is connected by a link 18 to the trough 13, so that when the crank is rocked on its shank the trough is tilted. As shown in Fig. 4, when the crank 15 is thrown outward to its utmost, the end of the trough nearest it is elevated. As shown in Fig. 5, when the crank is thrown in the opposite position, the trough is tilted to discharge the grain on the opposite side of the machine. In order to secure these two extreme adjustments, catches 19 are located on the side of the shelf, and over these the crank is sprung, where it is held fast until it is desirable to discharge the grain on the other side of the machine. This is done quickly by throwing the crank halfway around, as previously explained.

I will now describe the manner of swaying or rocking the shelf and trough in order to give a tossing motion to the grain. The outer portion or shank of crank 15 is provided with a wrist 20, and a pitman connects this wrist with a similar one 21 on the laterally-projecting end of the vertical rocking-shaft 22. The latter also terminates at its upper end with a crank 23, and this crank 23 is connected by a pitman 24 to shaking-bottom $o'$, so that when the latter reciprocates the vertical shaft is rocked back, and with each such rock the shelf is swung backward and forward, thus facilitating the discharge of grain.

Cylinder C is driven by a belt from the engine and the cylinder-shaft, the crank-shaft, the fan-shaft, and the beater-shaft are each provided with a pulley, and a single belt 25 is passed over the cylinder-shaft pulley, under the fan-shaft pulley, from thence up over the beater-shaft pulley, and finally under the crank-shaft pulley, thus driving the cylinder, fan, and beaters in one direction and the crank-shaft in the opposite direction.

It is evident that slight changes might be resorted to in the form and arrangement of the several parts described without departing from the spirit and scope of my invention; hence I do not wish to limit myself to the particular construction herein set forth; but, Having fully described my invention, what I claim as new, and desire to secure by Letters Patent, is—

1. In a grain-thrasher, the combination, with a cylinder, concave, and separator, of a swinging shelf, arms projecting upwardly from said shelf, a discharge-trough centrally supported on said arms, and a crank connected to the trough for tilting it, substantially as set forth.

2. In a grain-thrasher, the combination, with a cylinder, concave, and separator, of a swinging shelf, centrally-located arms thereon, a trough supported at its center on said arms, and a crank for changing the direction of inclination of the trough and connection between the shaking-bottom and shelf, whereby a lateral swinging motion is imparted to the shelf from the shaking-bottom, substantially as set forth.

3. The combination, with the cylinder and concave, of a grate pivoted in proximity to the cylinder, cams for raising or lowering this grate, an apron depending from the rear end of the grate, and a separator for conducting off the straw, substantially as set forth.

4. The combination, with a cylinder and concave, of a separator composed of movable frames, each frame having oppositely-extending inclines, one series of inclines of each frame being slotted transversely, the other series being slotted longitudinally.

5. The combination, with a cylinder and concave, of a separator composed of a series of frames supported on vibrating arms and a rotating crank-shaft, the upper faces of said frames being in the form of alternate long and short inclines, the former having ribs and slots extending across them and the latter having slots extending longitudinally of the frames, and toothed or stepped strips located on opposite sides of the long inclines, substantially as set forth.

6. The combination, with a cylinder, a concave adjustable grate, and apron depending therefrom, of a separator, substantially as described, and beaters for forcing the straw upon the separator, substantially as set forth.

7. The combination, with a cylinder and concave, of a separator consisting of several shaking-frames, each having oppositely-extending inclines thereon, and toothed strips secured to the sides of said frame, and the beater located near the front ends of the frames, substantially as set forth.

In testimony whereof I have signed this specification in the presence of two subscribing witnesses.

CHARLES H. HORTON.

Witnesses:
J. W. HOUGHTON,
E. C. DURAND.